Figure 1:
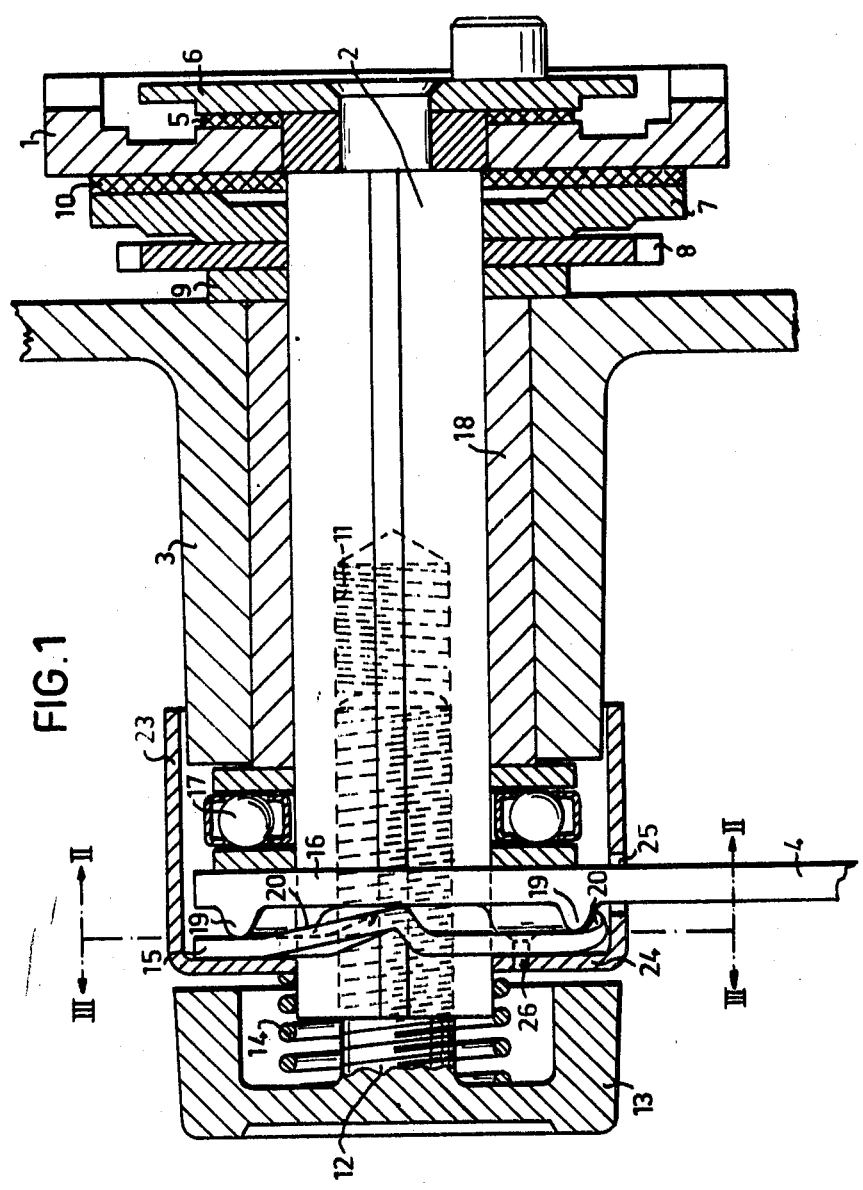

United States Patent

[11] 3,604,658

[72] Inventors Karl Nurmse;
       Hugo Ragnvald Svensson, both of Svangsta, Sweden
[21] Appl. No. 832,056
[22] Filed June 11, 1969
[45] Patented Sept. 14, 1971
[73] Assignee ABU Aktiebolag
       Svangsta, Sweden
[32] Priority June 17, 1968
[33] Sweden
[31] 8187/68

[54] FISHING REEL DRIVE MEANS
     5 Claims, 3 Drawing Figs.
[52] U.S. Cl. .................................................. 242/218
[51] Int. Cl. ........................................... A01k 89/00
[50] Field of Search .......................... 242/84.54, 84.44, 84.45, 84.46, 212–218

[56]                    References Cited
                    UNITED STATES PATENTS
| | | | |
|---|---|---|---|
| 2,329,381 | 9/1943 | Bannister | 242/84.44 |
| 2,922,595 | 1/1960 | Holahan | 242/84.54 |
| 2,977,065 | 3/1961 | Holahan, Jr. | 242/84.54 |
| 3,025,020 | 3/1962 | Sarah | 242/84.45 |
| 3,051,409 | 8/1962 | Sarah | 42/84.54 |
| 3,097,814 | 7/1963 | Sarah | 242/84.54 |
| 3,139,241 | 6/1964 | Johnson | 242/84.46 |
| 3,326,492 | 6/1967 | Murvall | 242/84.45 |

*Primary Examiner*—Stanley N. Gilreath
*Attorney*—J. Bradley Cohn

ABSTRACT: A fishing reel drive means includes a friction coupling having a regulatable slip action in which the drag can be reduced by backward rotation of a drive crank in a direction opposite to that in which the crank is turned to wind a line onto a pickup drum. The drive means includes a crankshaft which is connected behind the inner end of a crankshaft hub formed on the mechanism housing with a driving gearwheel over a known friction clutch, the slipping action or drag force of which can be adjusted by varying the force of a spring which is mounted between the outer ends of the crankshaft and a sleeve surrounding said shaft and which provides for inward movement of the crankshaft and outward movement of the sleeve. The crankshaft supports on its portion projecting beyond the outer end of the sleeve, when viewed outwardly from said sleeve, firstly an axial ball bearing abutting the outer end of the sleeve, secondly a crank hub abutting the outer side of the axial ball bearing and having restricted rotary movement and guided for axial movement on the crankshaft, thirdly axial cam projections disposed on the outer face of the crank hub and arranged in uniform, spaced relationship around the shaft, fourthly a cam plate with axial cam surfaces and mounted on the end of the crankshaft for guided movement longitudinally but locked against rotary movement, said cam surfaces when turning the crank hub in the winding direction relative to the hub shaft and the cam plate cooperating with the cam projections to divorce the cam plate from the crank hub. The spring consists of an axial pressure spring which at its inner end bears against the outside of the cam plate and at its outer end bears against the head of an adjuster screw which is screwed into the outer end of the crankshaft.

FISHING REEL DRIVE MEANS

The present invention relates to drive means for a fishing reel including a friction clutch having a regulatable slip action in which the drag can be reduced by backward rotation of a driving crank in a direction opposite to that in which the crank is turned to wind a line onto a spool or drum.

Arrangements of this type are known to the art, for instance from Swedish Pat. Nos. 167 217 and 203 705. In the arrangements described in the two aforementioned specifications the crankshaft is divided in two parts of which one supports the crank and the other supports a toothed wheel which drives the winding means by means of a friction clutch, the rotary movement of the shaft portions being restricted relative thereto to lengthen and shorten the crankshaft by means of screw surfaces, whereby the pressure on the friction clutch arranged between the gear wheel and the crankshaft is varied in response to the direction in which the crank is rotated.

One disadvantage always manifest in longitudinally divided crankshaft is that at least one of the parts obtains an axially short bearing surface, and that complicated arrangements are required to restrict the relative rotary and longitudinal movement of the shaft parts to retain the cooperating screw surfaces constantly within limit positions correct for the function of the device.

The object of the present invention is to eliminate the aforesaid disadvantages and to provide a simple and easily assembled device in which the crank after rotation in the winding direction and driving with the heavier slip or drag action automatically returns to a position corresponding to a lighter slip or drag action when the crank is released.

This object is achieved by the present invention which is mainly characterized in that the drive means includes a crankshaft which is connected behind the inner end of a crankshaft hub formed on the mechanism housing with a driving gear wheel over a known friction clutch, the slipping action or drag force of which can be adjusted by varying the force of a spring which is mounted between the outer ends of the crankshaft and a sleeve surrounding said shaft and which provides for inward movement of the crankshaft and outward movement of the sleeve, the crankshaft supporting on its portion projecting beyond the outer end of the sleeve when viewed outwardly from said sleeve firstly an axial ball bearing abutting the outer end of the sleeve, secondly a crank hub abutting the outer side of the axial ball bearing and having restricted rotary movement and guided for axial movement on the crankshaft, thirdly axial cam projections disposed on the outer face of the crank hub and arranged in uniform spaced relationship around the shaft, fourthly a cam plate with axial cam surfaces and mounted on the end of the crank shaft for guided movement longitudinally but locked against rotary movement, said cam surfaces, when turning the crank hub in the winding direction relative to the hub shaft and the cam plate, cooperate with the cam projections to divorce the cam plate from the crank hub and wherein the spring consists of an axial pressure spring which at its inner end bears against the outside of the cam plate and at its outer end bears against the head of an adjuster screw which is screwed into the outer end of the crankshaft.

The crankshaft is provided with one or more longitudinally extending chambers, e.g. by being worked from square rod material, and the cam plate has a central opening corresponding to the cross section of the inner shaft, while the central opening of the crank hub encircles the crankshaft with a clearance which permits the requisite restricted rotatability of the crank relative to the crankshaft.

A protection cap which with an essentially cylindrical portion thereof surrounds the outer end of the hub, the ball bearing, the crank hub and the cam plate is resiliently clamped at its transversally extending end wall between the cam place and the spring and is provided with an opening exhibiting a shape corresponding to the cross section of the crankshaft and which presents in its cylindrical casing portion a laterally directed opening for the crank arm.

To enable the cam plate to be assembled in its correct position of rotation relative to the crank hub, whose position relative to the protective cap is determined by the laterally directed opening therein, the cam plate is provided with an eccentric stud which is accommodated in a corresponding hole in the transversely extending end portion of the cap.

Figure 2:
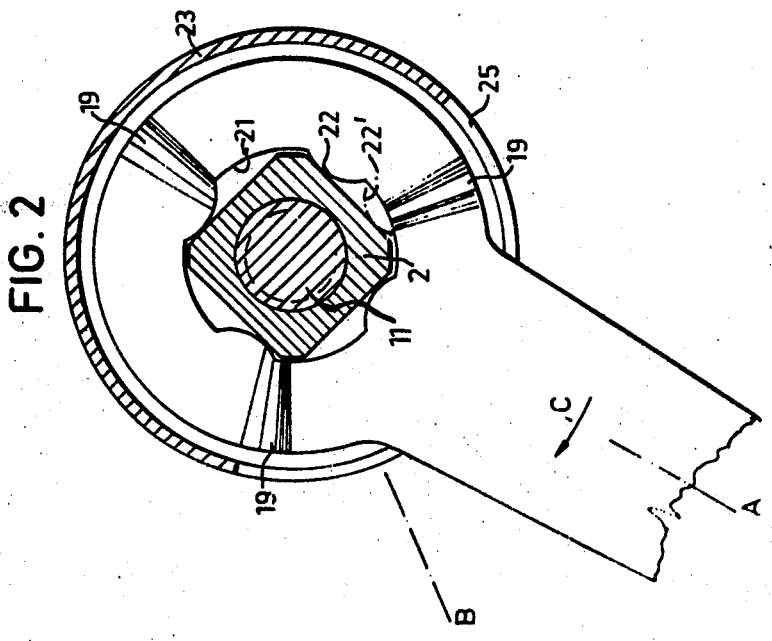

An embodiment of the invention is shown diagrammatically on the accompanying drawings, in which FIG. 1 is an axial longitudinal section through the drive means, the actual crankshaft, the crank hub and the cam plate being shown in side view, FIG. 2 is a section essentially through the line II—II in FIG. 1.

Figure 3:
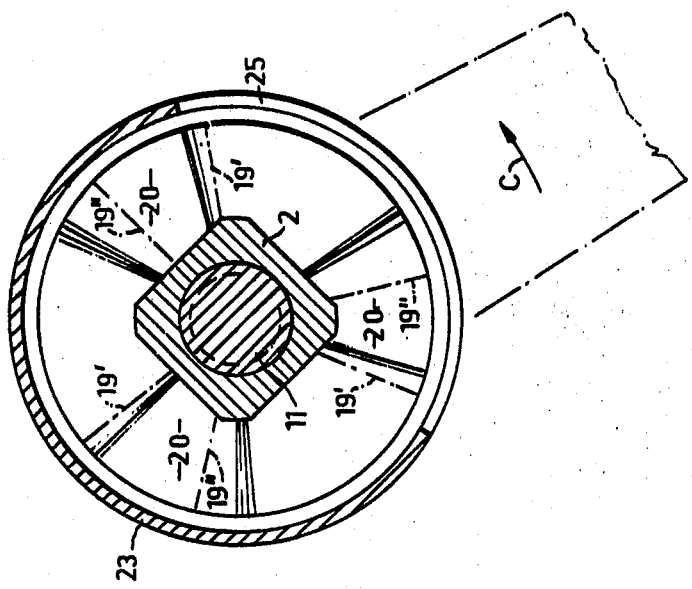

FIG. 3 is a section taken essentially through the line III—III in FIG. 1.

As with known fishing reels, the shaft of a rotatable winding means (not shown) is provided with a gear wheel (not shown) meshing with a driving gear 1 which is mounted for rotation on a crankshaft 2 journaled in a hub 3 of the reel mechanism casing and which outside the outer end of the hub 3 carries a crank 4. The drive gear 1 is friction coupled in a known manner via a friction insert member 5 to an end plate 6 fixedly attached to the shaft 2. A support plate 7, which is nonrotatable but guided for longitudinal movement on the crankshaft 2, bears against the inner surface of the mechanism casing through intermediate plates 8 and 9 of which one, 8, is suitable designed to form a reverse lock wheel nonrotatably mounted on the shaft 2. A second friction insert member 10 is placed between the drive gear 1 and the support plate 7. By pulling the crankshaft 3 crankshaft 2 more or less hard outwardly in the hub 3, the drive gear 1 is squeezed between the friction insert members to the same degree and therefore rotates against a greater or smaller slip component relative to the crankshaft. The members 5–10 forming the friction clutch are previously known per se.

The invention is concerned with means for increasing the slip of the friction clutch 5–10 when turning the crank 4 in the winding direction in which the front face of the crankshaft 2 and the crank 4 move downwards in FIG. 1, clockwise in FIG. 2 and counterclockwise in FIG. 3.

The crankshaft 2 protrudes slightly beyond the outer end of the hub 3 and has a threaded bore 11 which opens out into said outer end and in which is screwed a screw 12 having a bell-shaped head 13 which forms a support for the outer end of a coil pressure spring 14 which bears against the outer end of a sleeve 18 over a cam plate 15, the platelike hub 16 of the crank and an axial ball bearing 17, said sleeve being mounted for rotation in the hub 3 and abutting with the inner end of the intermediate plate 9 bearing against the inner side of the casing. The spring 14 thus exerts an outwardly directed tension force (to the left in FIG. 1) on the crankshaft 2 and inwardly directed pressure (to the right in FIG. 1) on the sleeve 18. The tension of the spring 14 thus determines the compression force between the end plate 6 and the intermediate plate 9 and thereby the drag or slip of the friction clutch 5–10. This drag can be adjusted by screwing the screw 12, 13 in and out.

To provide for automatic adjustment of the drag when rotating the crank in the winding direction, the crank hub 16 is provided on the side thereof facing the cam plate 15 with cam projections 19 which cooperate with helical cam surfaces 20 on the cam plate 15. The crankshaft is provided with axial chamfers, in the exemplary embodiment four, suitably provided by producing the crankshaft from a bar of square cross section. The members 7, 8 and 15, capable of moving axially along the shaft 2 but incapable or rotating thereon, are provided with holes corresponding in shape to the cross section of the shaft to enable said members to be fitted to the shaft. The crank hub 16 is provided with a circular hole 21 having a diameter corresponding to the diagonal of the shaft section and an inwardly extending projection 22 against which the corners of the shaft section strike to restrict the rotative movement of the crank on the shaft 2 in either direction.

When the crank 4 is turned clockwise in FIG. 2 from position A to position B in the direction of arrow C, the crank hub 16 rotates freely relative to the crankshaft 2 until projection 22 reaches the position indicated at 22' from which the shaft 2 is entrained with the rotation of the crank. During the thus restricted free rotation of crank 4 relative to the shaft 2, the cam projection 19 on crank hub 16 is moved relative to the cam plate 15 along the oblique surfaces 20 thereof, whereby the cam plate 15 is moved axially outwards to compress the spring 14, thereby increasing the slip force or drag in the friction clutch 5–10. Any run which a fish might make while winding in the line must be made against the increased drag. The ball bearing 17 ensures that the friction between the crank hub 16 and the sleeve 18, between which the whole of the spring force determining the drag shall be transmitted, does not cause the shaft to be entrained before the projection 22 bears against the crankshaft 2. The ball bearing 17 also reduces the resistance to friction against rotation of the crank hub 16 relative to the sleeve to such an extent that the hub 16 under the influence of the force spring 14 by the inclined surfaces 20 in coaction with the cam projections 19 automatically rotates the crank 4 back to the position FIG. 2) corresponding to the lighter drag force in the friction clutch 5–10 as soon as the crank is released, which is to great advantage when, for instance, a fish makes a sudden run as the hand which normally operates the crank releases the crank in order to grip a landing net or gaff hook.

FIG. 2 shows the crank 4 and the crank hub 16 as seen from the left in FIG. 1. FIG. 3 shows the cam plate 15 seen from the right in FIG. 1. The crank hub 16 in the exemplary embodiment is provided with three cam projections in the form of radial ridges 19, and the cam plate with three inclined, active surface portions 20 which in FIG. 3 occupy sectors 20.

FIG. 3 shows the position of the cam projections 19 relative to the cam plate 15 with chain lines 19' in the starting position shown in FIG. 2 which corresponds to the reduced drag and with the chain lines 19" in the position taken subsequent to rotating the crank 4 from the position A to the position B FIG. 2).

By means of the arrangement of the invention it is possible, in addition to normal adjustment of the desired initial drag by screw 12, to more or less completely block the friction clutch 5–10 by screwing in screw 12 until its head 13 holds the cam plate 15 tightly pressed against the hub 16 while the projection 19 is in the position which corresponds to the lighter drag relative to the cam surfaces 20. The cam plate is then no longer able to move axially. Such blocking of the friction clutch may be suitable for fish where a tight transmission between crank and winding means is desired, for instance when using the reel for cod jigging.

In the exemplary embodiment the cam plate 15, the crank hub 16, the ball bearing 17 and the outer end of the hub 3 are enclosed in a protective cap 23 which has a transversely extending end wall 24 provided with a hole corresponding to the cross-sectional shape of the shaft 2 to enable it to be fitted to the shaft 2 between the cam plate 15 and the spring 14. The cap has a laterally directed opening 25 through which the hub 16 can be inserted prior to being assembled onto the shaft. Since the crank hub 16 and the cam plate 15 of the exemplary embodiment can be mounted to the shaft in four different positions of rotation and since there are only three cam projections and cam surfaces 20, the cam plate and the crank hub must be assembled in a specific position relative to each other. In order to facilitate assembly of the crank hub and the cam plate in the correct position it is expedient to use the cap 23 as a position reference means for the two former members. The side opening 25 of the cap determines the position 16 of the crank 4, while the cam plate 15 is provided with a small, axially projecting stud 26 which passes into a corresponding hole in the transversely extending end wall 24 of the protective cap thus determining when assembling the positions of the crank hub 16 and the cam plate 15 relative to the protective cap and thereby to each other.

The invention is not restricted to the shown embodiments. The division of the cam surfaces and cam projections into three is expedient for reasons of manufacture. The number of four bevelled surfaces on the shaft 2 is expedient for the same reason since this permits drawn bar material to be used as the shaft 2 and the sleeve 18 only perform small relative rotary movements. However, depending upon the dimensions of and requirements placed on the arrangement it lies within practical limits to provide the same number of bevelled surfaces and camming means, in which case the special means adapted to determine the relative rotative positions become unnecessary. Additional modifications are also possible within the purview of the invention. The arrangement of the invention can be adapted in a simple manner for use in connection with a left-hand wind reel. In this connection it is only necessary to replace the cam plate 15 with one whose cam surfaces 20 are inclined in the opposite direction and to change the direction in which the reverse stop wheel 8 acts.

What we claim is:

1. Fishing reel drive means including a friction coupling having a regulatable slip action in which the drag can be reduced by backward rotation of a drive crank in a direction opposite to that in which the crank is turned to wind a line onto a pickup drum, characterized in that said means includes a crankshaft which is connected behind the inner end of a crankshaft hub formed on the mechanism housing with a driving gear wheel over a known friction clutch, the slipping action or drag force of which can be adjusted by varying the force of a spring which is mounted between the outer ends of the crankshaft and a sleeve surrounding said shaft and which provides for inward movement of the crankshaft and outward movement of the sleeve, the crankshaft supporting on its portion projecting beyond the outer end of the sleeve, when viewed outwardly from said sleeve, firstly an axial ball bearing abutting the outer end of the sleeve, secondly a crank hub abutting the outer side of the axial ball bearing and having restricted rotary movement and guided for axial movement on the crankshaft, thirdly axial cam projections disposed on the outer face of the crank hub, and arranged in uniform spaced relationship around the shaft, fourthly a cam plate with axial cam surfaces and mounted on the end of the crankshaft for guided movement longitudinally but locked against rotary movement, said cam surfaces, when turning the crank hub in the winding direction relative to the hub shaft and the cam plate, cooperate with the cam projections to divorce the cam plate from the crank hub, and wherein the spring consists of an axial pressure spring which at its inner end bears against the outside of the cam plate and at its outer end bears against the head of an adjusting screw which is screwed into the outer end of the crankshaft.

2. The means of claim 1, characterized in that the crankshaft is provided with at least one longitudinally extending chamfer, and that the cam plate presents a central opening corresponding to the cross section of the crankshaft, while the central opening of the crank hub encircles the crankshaft with a clearance which permits restricted rotation of the crank relative to the crankshaft.

3. The means of claim 1, characterized in that a protective cap, which with a substantially cylindrical portion thereof encloses the outer end of the hub, the axial bearing, the crank hub and the cam plate, is resiliently clamped at a transversely extending wall thereof between the cam plate and the spring and provided with an opening corresponding to the cross-sectional shape of the crankshaft, and further provided in its cylindrical surface with a laterally directed opening for the crank.

4. The means of claim 3, characterized in that the cam plate is provided with an axially, outwardly projecting position determining stud which projects into a corresponding hole disposed in the transverse end wall of the cap.

5. The means of claim 1 characterized in that the adjusting screw has a bell-shaped head which embraces the spring and which in its extreme screwed-in position holds with its free edge the crank hub and the cam plate pressed tightly together to tighten hard or block the friction coupling.

UNITED STATES PATENT OFFICE
CERTIFICATE OF CORRECTION

Patent No. 3,604,658                     Dated September 14, 1971

Inventor(s) Karl Nurmse and Hugo Ragnvald Svensson

It is certified that error appears in the above-identified patent and that said Letters Patent are hereby corrected as shown below:

Column 1, line 21, pluralize "crankshaft"

Column 1, line 62, change "chambers" to --chamfers--

Column 2, line 31, strike out "crankshaft 3"

Column 2, line 66, change "or" to --of--

Column 3, lines 37 & 38, correct "FIG.2)" to read --(FIG. 2)--

Signed and sealed this 14th day of March 1972.

(SEAL)
Attest:

EDWARD M. FLETCHER, JR.          ROBERT GOTTSCHALK
Attesting Officer                Commissioner of Patents